A. G. DONNELLY.
PROJECTING APPARATUS.
APPLICATION FILED MAY 15, 1912.
1,115,913.
Patented Nov. 3, 1914.
9 SHEETS—SHEET 6.
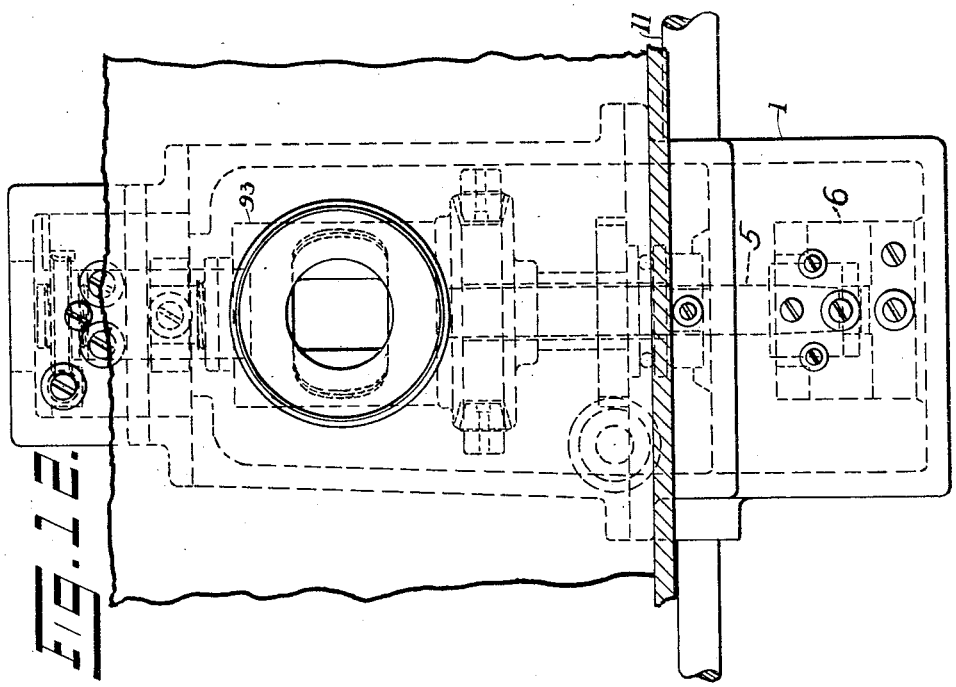
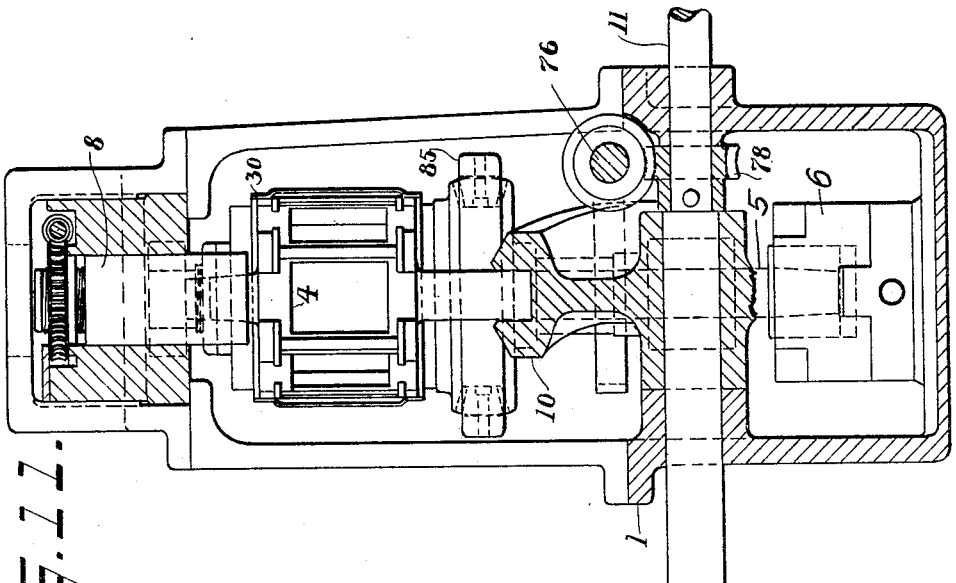
Witnesses:
Chas. E. Whitman
H. O. Penney
Inventor:
A. G. Donnelly,
By his Attorney, T. H. Richards.

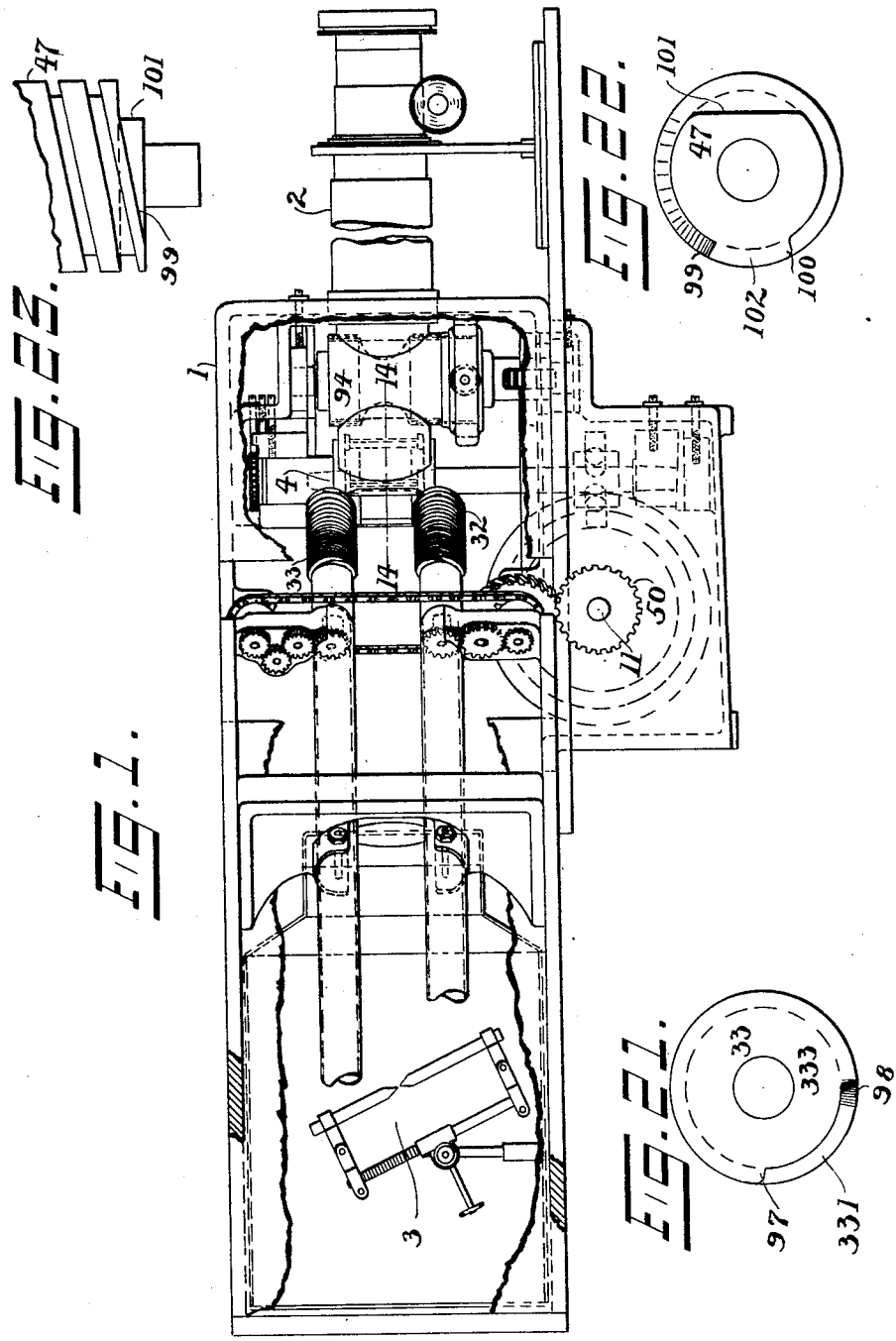

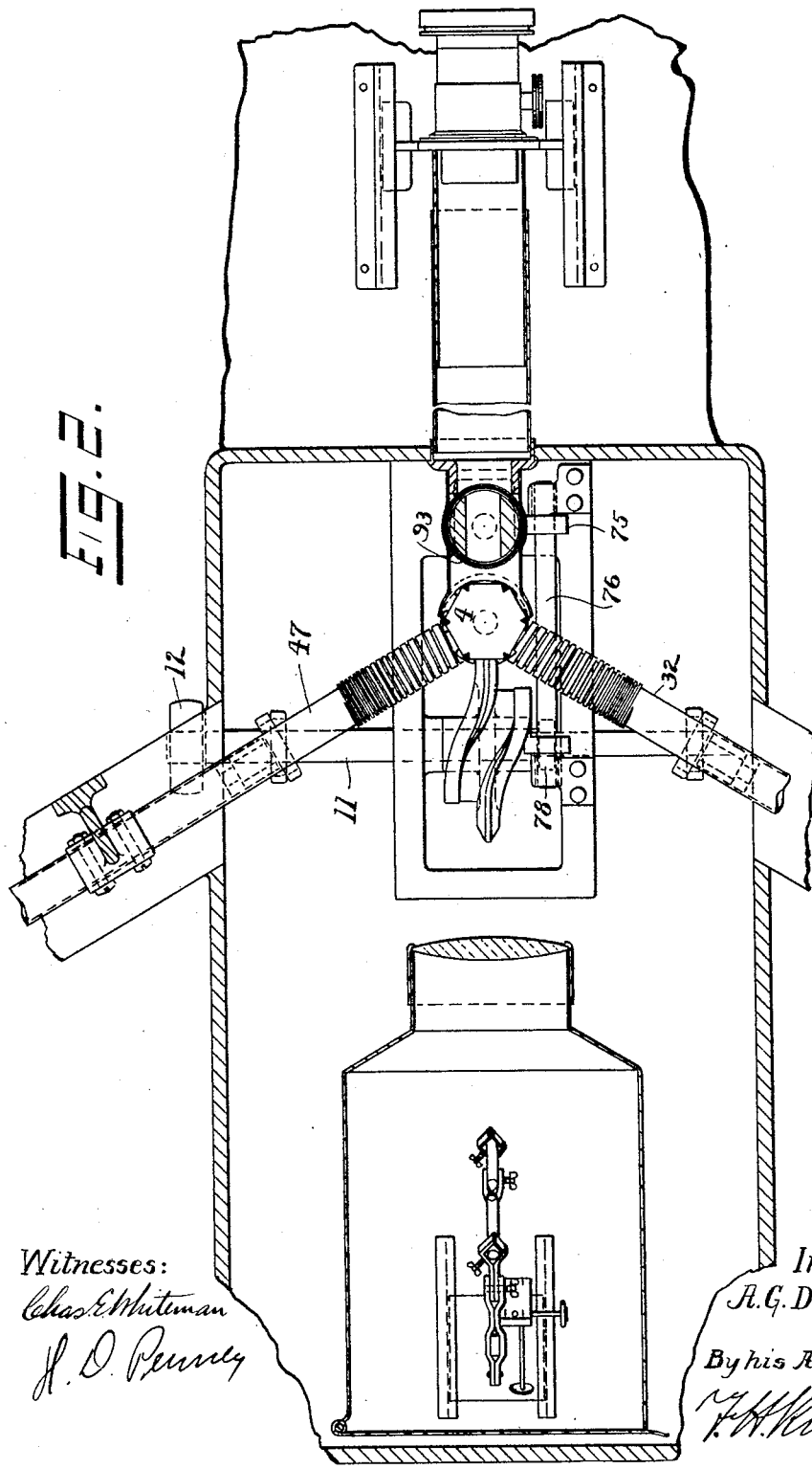

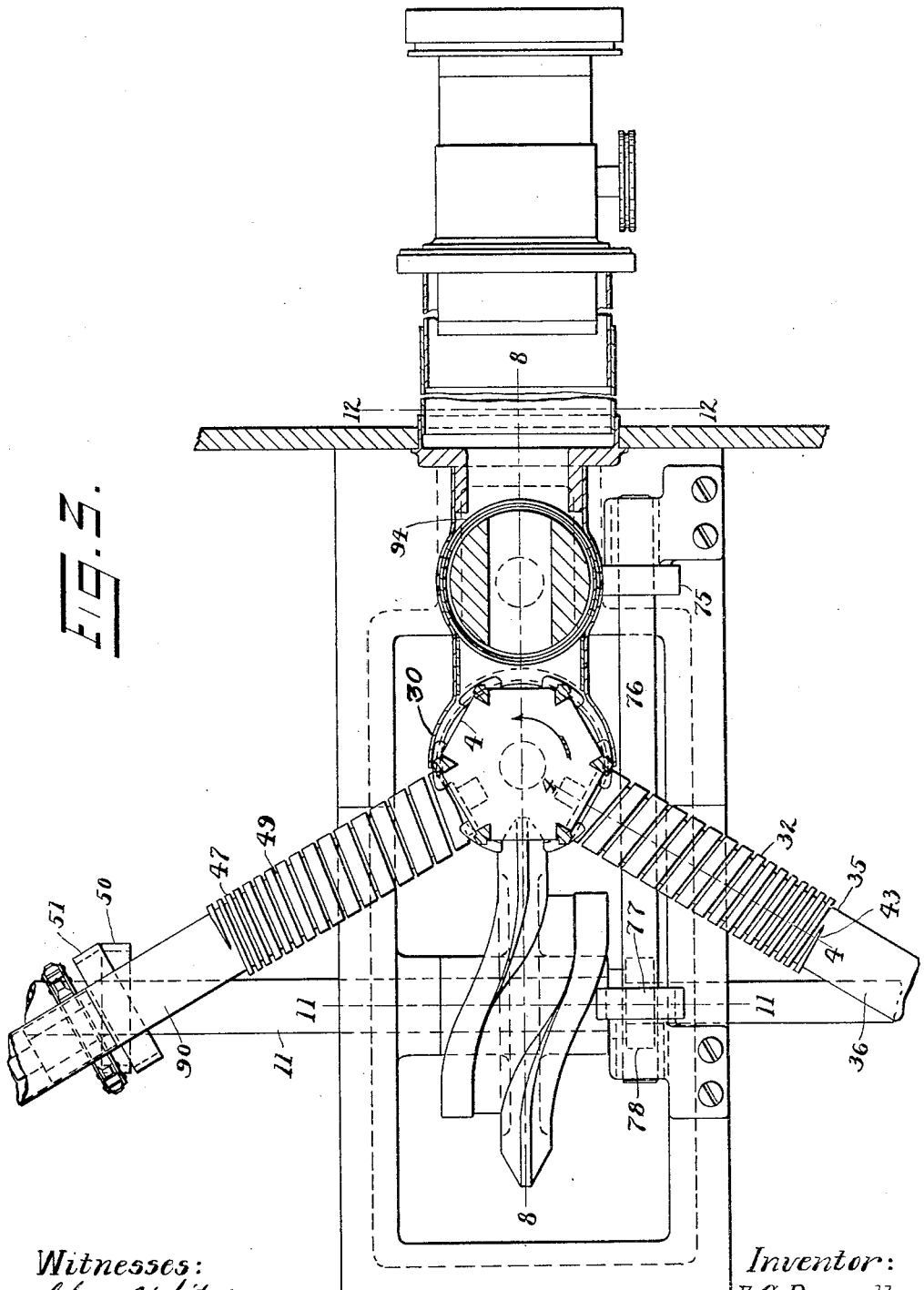

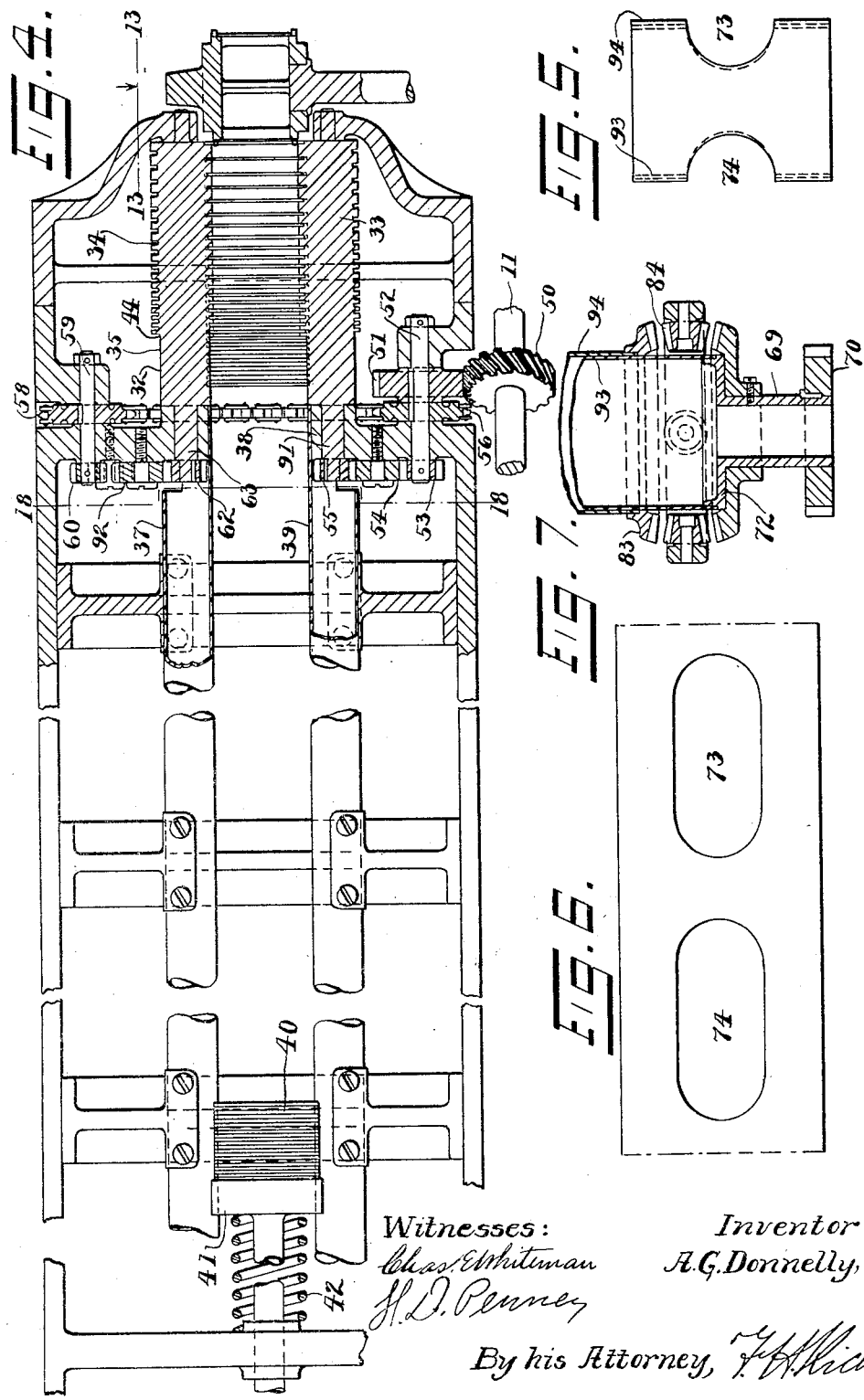

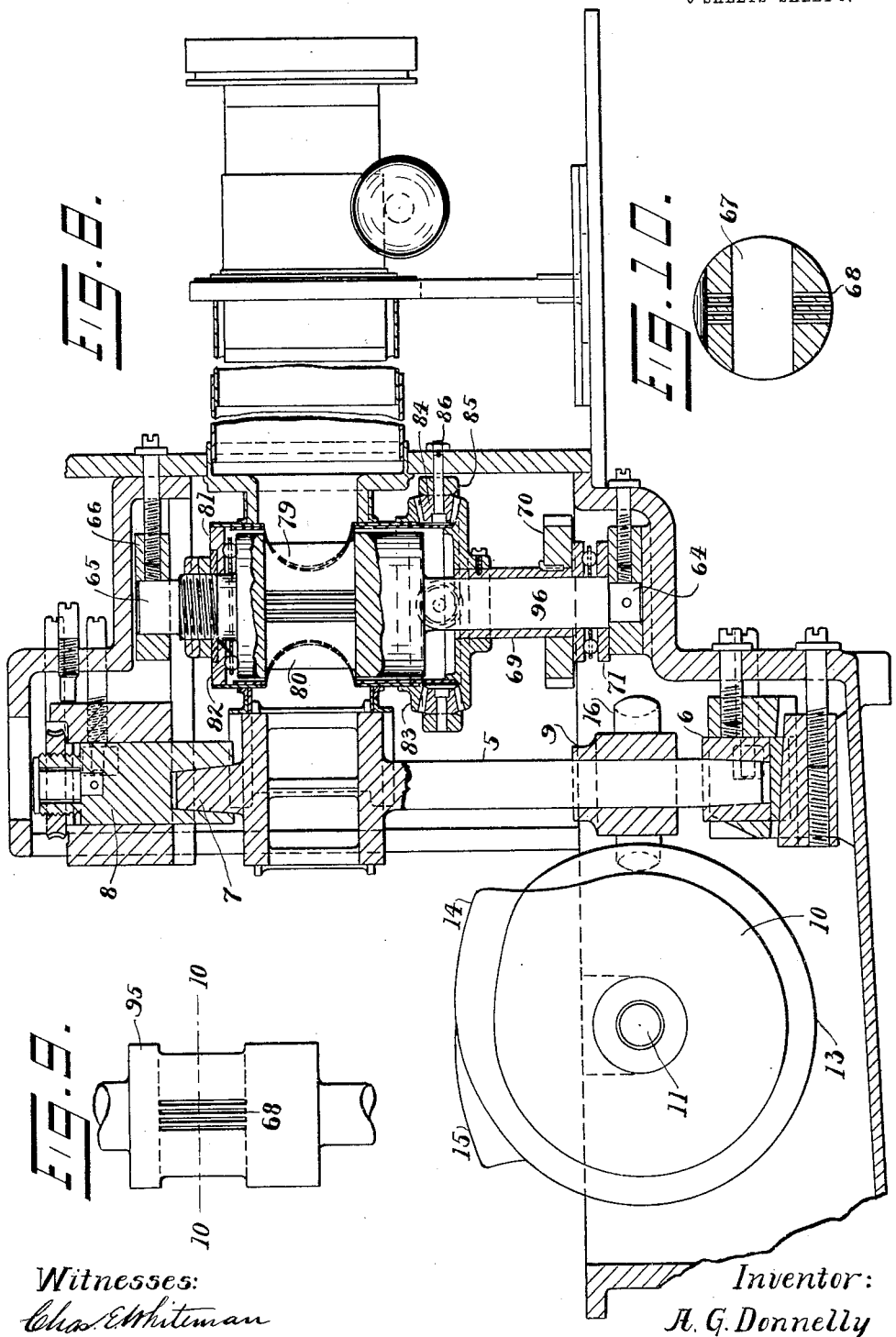

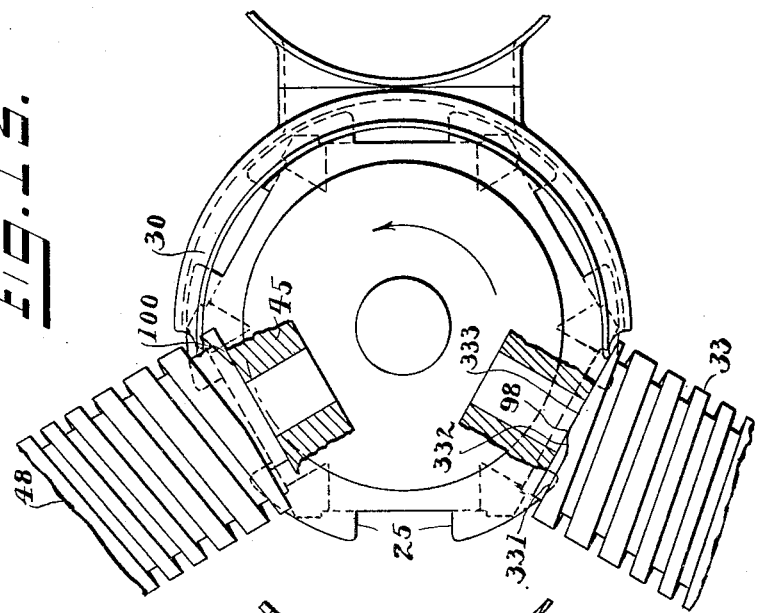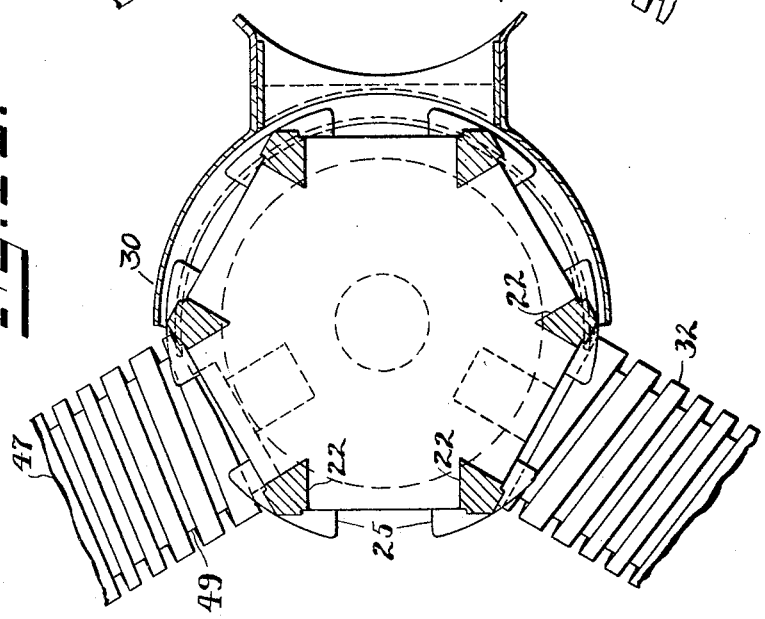

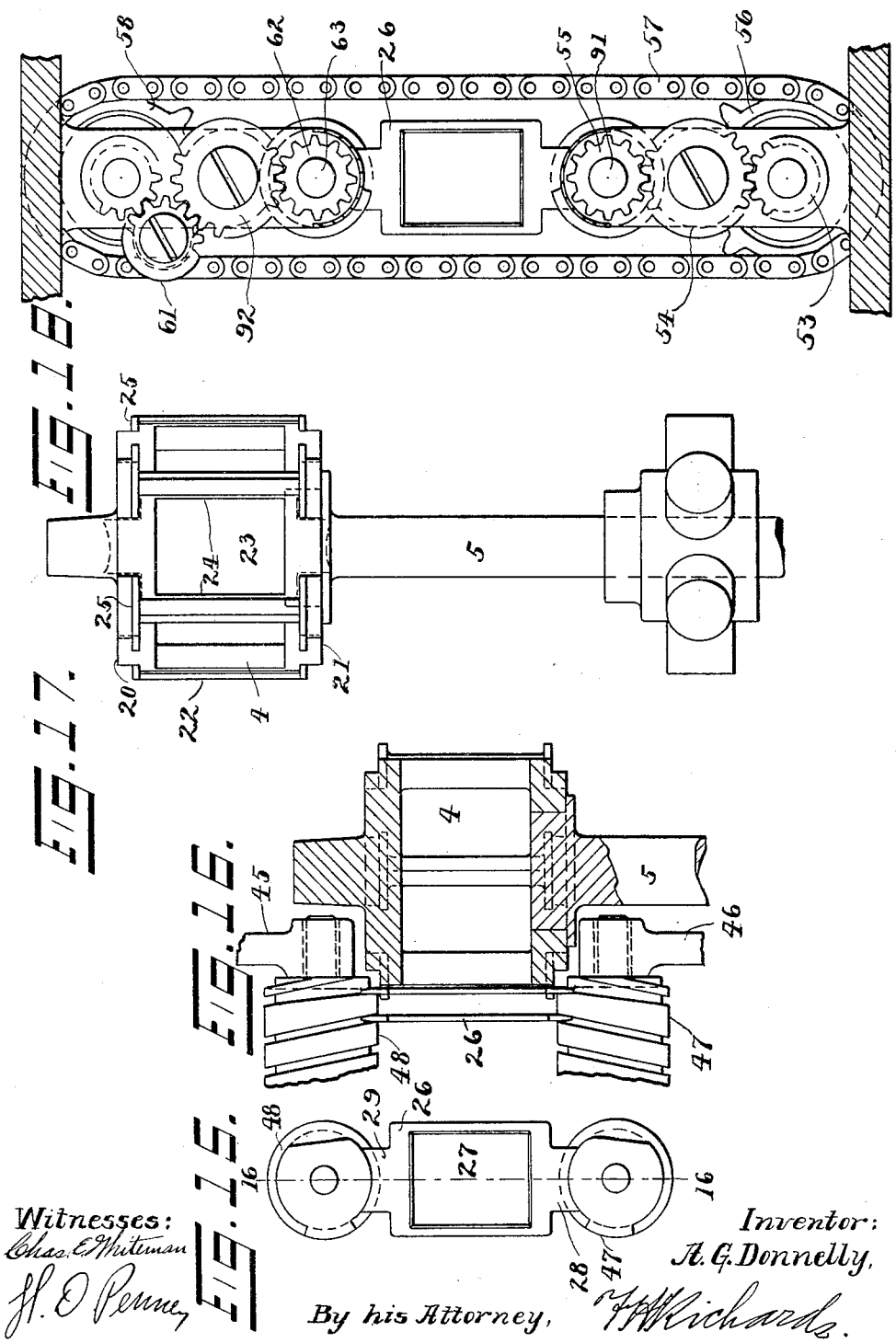

A. G. DONNELLY.
PROJECTING APPARATUS.
APPLICATION FILED MAY 15, 1912.
1,115,913.
Patented Nov. 3, 1914.
9 SHEETS—SHEET 9.
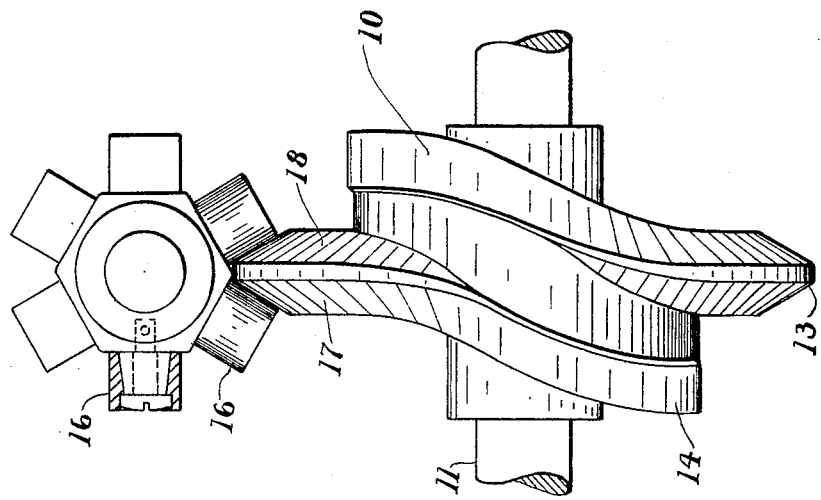
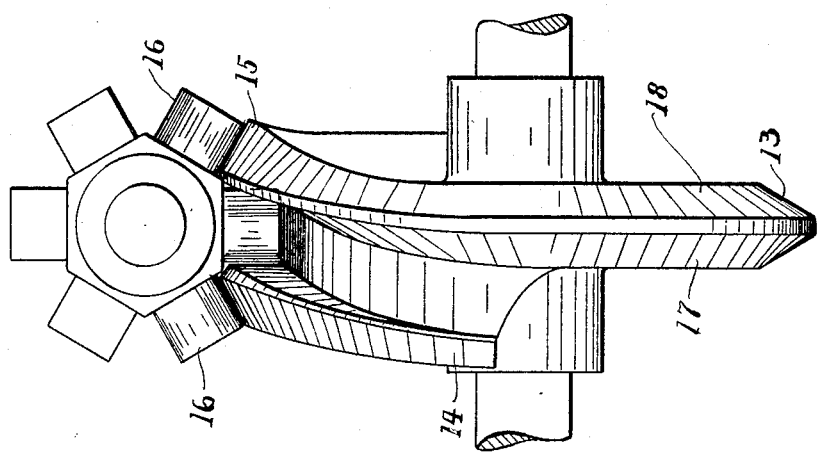
Witnesses
Chas. E. Whiteman.
H. D. Penney
Inventor:
A. G. Donnelly,
By his Attorney,
F. A. Richards.

UNITED STATES PATENT OFFICE.

ALEXANDER G. DONNELLY, OF NEW YORK, N. Y., ASSIGNOR, BY DIRECT AND MESNE ASSIGNMENTS, TO QUASAPIC COMPANY, INC., OF NEW YORK, N. Y., A CORPORATION OF NEW YORK.

PROJECTING APPARATUS.

1,115,913. Specification of Letters Patent. Patented Nov. 3, 1914.

Application filed May 15, 1912. Serial No. 697,383.

*To all whom it may concern:*

Be it known that I, ALEXANDER G. DONNELLY, a citizen of the United States, residing in New York city, in the county of New York and State of New York, have invented certain new and useful Improvements in Projecting Apparatus, of which the following is a specification.

This invention has for its object to provide a form of projection apparatus that may be used both for the purpose of photographing successive pictures of objects in motion, and projecting such pictures successively on a screen to represent the movement that has been recorded, in which apparatus the series of views are recorded on a set of plates that are advanced by a continuous movement to a positioning member that intermittently positions them in the focus of the lens and then advances them to a suitable receiving member.

A further object is to provide, in addition to the continuously moving feed member and the intermittently moving positioning member, a retracting member for receiving the plates from the positioning member that is operated by a continuous movement.

A further object is to provide a form of feeding member, as set forth, wherein the plates will be received by the member in a contacting series, and will be advanced by an accelerated movement and at the same time spaced apart to be fed at intervals to an intermittently advancing positioning member.

A further object is to provide a similar form of retracting member whereby the continuous movement of such member will serve to receive the plates at intervals from the positioning member after they have been exhibited and advanced them, first spaced apart, and then gradually caused to approach each other to be delivered in a contacting series.

A further object of the invention is to provide a member for bringing the plate or image member into position successively and hold it in such position, whereby the time of exposure is greater than, or substantially double, the time of movement.

Another object of the invention is to provide an improved form of actuating member for the said positioning member, or turret, that is connected with the feeding and retracting members to be properly timed relatively thereto, and which will cause the positioning member to be advanced intermittently step by step, by a movement that is gradually accelerated from the start and then gradually retarded to the arrested position.

Another object is to provide an improved form of shutter for cutting off the light from the lenses at the period of movement of the positioning member, which shutter will have two members moving toward the center from the outside to close the light path, and will move from the center to the outside to open the path of light after the positioning member has been shifted to bring another plate to the position of exhibition.

A further object is to provide, in connection with the shutter device, means for receiving color plates or screens for exhibiting colored pictures.

In the accompanying drawings showing one embodiment of my invention, Figure 1 is a side elevation of the device with the side plate broken away to show the interior; Fig. 2 is a plan view of the device with the top or cover removed; Fig. 3 is a view similar to Fig. 2 on a larger scale with the projection apparatus not shown; Fig. 4 is a vertical section on the line 4—4 of Fig. 3, showing a coöperating pair of feed screws; Fig. 5 shows one of the shutter members; Fig. 6 shows the shell of the shutter member as developed in a plane; Fig. 7 is a vertical section through the shutter member with the stationary plug omitted; Fig. 8 is a vertical section on the line 8—8 indicated in Fig. 3; Fig. 9 is a fragmentary view of the plug member of the shutter device and Fig. 10 is a cross section of the latter on the line 10—10 of Fig. 9; Fig. 11 is a vertical section on the line 11—11 of Fig. 3; Fig. 12 is a vertical section on the line 12—12 of Fig. 3 with the front plate omitted; Fig. 13 is a vertical section, enlarged, on the line 13—13 of Fig. 4; Fig. 14 is a similar view on the line 14—14 of Fig. 1; Fig. 15 is a fragmentary view showing the ends of two coöperating screws and one of the plates; Fig. 16 is a section on the line 16—16 of Fig. 15 with the supports for the screws, the turret also being shown; Fig. 17 is a fragmentary view showing the turret and its operating member; Fig. 18 is a section on line 18—18 of Fig. 4; Fig. 19 is a view of the feed screw and the operating member on the turret shaft; Fig. 20 shows the same parts farther advanced; Figs. 21 and 22 are end views of the slide advancing screws, and Fig. 23 shows a side view on one of the screws.

The apparatus is shown in Fig. 1 as mounted in a suitable casing 1, at the front of which is shown suitable projecting means 2, and a source of light 3 at the rear, which may be of any suitable arrangement. In the axis between these two members is arranged a positioning member shown in the form of a rotatable head or turret 4, whose position is best shown in Fig. 2. The turret, as shown in Figs. 8, 11 and 12, is carried by an adjustable spindle 5 mounted in a step bearing 6 of suitable construction. At the top of the turret is a journal 7 mounted in a suitable adjustable bearing 8. On the shaft 5 is a member 9 in the nature of a gear or toothed member that is engaged by a cam or worm member 10 mounted on a shaft 11 extending across the casing and supported in suitable bearings. This shaft 11 forms the main driving shaft of the apparatus and may be operated by a pulley 12 at one end thereof, as shown in Fig. 2.

The cam member 10 has a straight portion 13 in which the annular rib extends in a plane perpendicular to the axis of the shaft, and at the opposite portion the rib divides into two spiral portions 14 and 15 that are spaced to receive the rollers 16 successively. It will be seen from Fig. 19 that the member 9 has six of these rollers 16 arranged with their axes extending at an angle of 60 degrees, and that the rollers are cylindrical. The rib 13 will therefore have its side faces 17 and 18 extending at an angle of 60 degrees to be engaged by the adjacent rollers 16. The cylindrical portion 10 of the rib extends for about 240 degrees around the member and the spiral portions 13 and 14 occupy about 120 degrees of the circumference. From this it follows that the member 9 will be held stationary for two-thirds of the rotation of the cam member, while during the other third of the revolution the member 9 will swing and advance the turret one-sixth of a revolution. It will also be understood that the spiral surfaces are in the general form of an ogee whereby the turret is started and arrested by a gradual movement.

The turret, as shown best in Fig. 17, is formed of two disk members 20 and 21 connected by cross members 22, whereby six openings 23 are provided that are equidistant, and the turret is arranged on the shaft relative to the cam member so that two opposite openings 23 register with the focus of the lens and light, as indicated in Fig. 2. At these openings the several plate members are successively brought and retained while a suitable shutter device will permit the projection of the image on a screen for an instant and then cut off the rays as the turret is advanced to bring the next plate into the path of light for exposure or exhibition. At the sides of the opening 23 are provided lugs 25. This arrangement is designed to receive suitable holders or plates for the films or images, one of the plates 26 being shown in Fig. 15 in the form of a metal frame, in the opening 27 of which a plate of glass or other transparent material is suitably secured, that contains the image, or the sensitized emulsion.

At the opposite ends of the plate 26 are projections 28 and 29 of a width to fit between the opposite lugs 25, at each side of the opening 23, while the sides of the plate fit between the ledges 24 to properly position the plate on the turret when presented at the opening 23. The projections 28 and 29 extend beyond the lugs 25 when the plate is placed at the opening, as indicated in broken lines in Fig. 17, and as illustrated in Figs. 3, 11, 13 and 14 the segmental cylindrical envelop 30, axially perforated for the slide exposure, extends around and adjacent to the rear side of the turret between the feed screws to retain the slides in position. Means are provided for presenting the plates to one of these open faces of the turret, and after such plate has been advanced to the focus for exhibition or exposure and the turret is thereupon farther advanced, means are provided for removing the plate from the turret; whereby as the turret is advanced the plates are successively presented to these faces at one place and successively removed at another place, and the operation of the machine is continuous as long as the plates are presented by the feeding means.

To feed the plates, a pair of rotatable members 32 and 33 in the nature of screws are provided that are arranged in parallel in vertical alinement, as indicated in Fig. 4, and are symmetrically arranged, that is with the same form of screw thread, and are rotated in synchronism by suitable connecting means. The plate projections 28 and 29 are curved to correspond with the bottom of the screw thread, as indicated in Fig. 15, whereby the plate when placed between these two screws as here shown, is advanced as a nut would be advanced, and in the same direction by having the screws reversed, that is right and left respectively, and rotated in opposite directions.

Since the thread, that is, the channel 34 between the thread portions, must have a lead and be inclined to a plane perpendicular to the axis of the screw, the plate as advanced will be slightly inclined laterally, although in Fig. 4 the plates are represented as perpendicular to the axes of the screws.

From Fig. 3, and elsewhere, it will be seen that the threaded portion of the screw member 32, that has what is termed a square thread, amounts to practically a cylinder with a spiral groove 34 cut therein, which has sides practically perpendicular to the axis of the screw; and it will be further seen that this spiral groove has its lead decreasing from the extremity of the screw adjacent the turret, backwardly to the portion 35, where the screw member extends as a cylinder whose surface alines with the bottom of the groove 34. In other words, the threaded portion of the member stops at this place. The coöperating screw member 33 is similarly constructed, but as stated the spiral groove 34 of this member extends in the opposite direction, the screws being right and left handed respectively. The smooth cylindrical portion 35 of the screw member 32 is shown as merging into a tubular extension 37, and the cylindrical portion 38 of the screw member 33 merges into a cylindrical extension 39. The slides 26 have their curved extensions 28 and 29 brought to engage the extremities of these tubes 37 and 39 as indicated at the left in Fig. 4, a group of these slides being shown at 40; and they are advanced along the tubes by suitable means, such as a follower 41 that may be moved by a spring 42 to feed the slides along to the screw portions 32 and 33. As the screw members rotate, through suitable means as hereinafter set forth, the extremities 43 and 44 of the screws will engage the respective extensions 28 and 39 of the plates, whose edges are preferably somewhat rounded, as shown in Fig. 16, along the curved edge, and they will be caused to enter the thread, one for each rotation of the screw members. As the spiral grooves are the minimum distance apart at this end of the screw, and gradually increases, as indicated in Figs. 3 and 4, the successive plates will have their distance apart thereby increased by such amount, and they will be advanced by an accelerated movement, so that when they are delivered at the extremity of the member to the turret they will be a considerable distance apart. Therefore, at each revolution of the screw members 32 and 33 one slide will be delivered at the turret portion adjacent the end of the screw members.

The two screw members are rotated in synchronism by suitable means, that is, it drives them continuously at a uniform speed from the driving shaft 11, on which the cam or screw is mounted that intermittently advances the turret 4, and such connecting mechanism is timed whereby the turret is at rest with one of the apertured faces 23 positioned opposite the ends of the screw members 32 and 33 at the time of delivery from the screw members of a plate, and thereupon the turret is advanced one-sixth of a revolution to bring the next receiving face opposite the end of the screws to receive the next succeeding plate, and so on in succession.

The screw members 32 and 33 are supported on bearings 45 and 46 that overhang the turret 4, the latter being positioned to have the lugs 25 extend between the screw members so that the extensions 28 and 29 will be advanced by the screws between the lugs 25 at this portion of the turret, at both ends of the plate. But it will be seen from Fig. 16 from the wide distance the two threads are separated, that the lugs 25 will not interfere with the next plate that is being advanced, as the turret is swung to advance the plate received and bring its succeeding face and lugs to receive the next plate.

Upon the rotation of the turret in the direction of the arrow shown in Fig. 3, the second advance of the turret after receiving a plate from the screws 32 and 33, will bring the plate into the focus of the lens. After exposure or exhibition of the plate in this position, it is advanced by the turret to the other side of the casing, and suitable means are provided for withdrawing or retracting the plates after passing beyond the path of exposure. A pair of screw members 47 and 48 are provided at the second stage of the movement beyond the position of exposure, as indicated in Fig. 3, whereby the turret will have no plate therein at the rear portion, and hence the passage of the light rays from the light to the lenses through the forward plate will not be obstructed. The screw members 47 and 48 are formed substantially similar to the said screw members 32 and 33. In Fig. 3 the screw member 47 is shown as having a square spiral channel 49 extending from the end adjacent the turret back to an extension 90 of the member that has no threads but engages the curved extremities of the plates. The two members 47 and 48 are practically duplicates, but have the spiral grooves right and left handed, respectively, and these two members are rotated in reverse directions to move the slides from the turret back along their screw portion and then along the cylindrical portions. The extremities of the screw members 47 and 48 are positioned adjacent the turret, as indicated in Figs. 2 and 3, and after each plate has been exposed and advanced by two movements of the turret, it will be located at the end of these screw members, and the threaded portions are so arranged as to engage the extremities of the plate and direct them into the channel 49.

Of course, the screws 47 and 48 rotate synchronously with the screws 32 and 33, and make one revolution for each advance of the turret, similar to the feed of the screws 32, 33. When the turret is brought to rest, these screws 47, 48, will engage the plate and withdraw it from the turret permitting next advance of the turret to bring into position the next succeeding plate to be engaged by these screw members. The means set forth by which these four screw members are rotated in unison, is best shown in Figs. 1, 4 and 18, in which a spiral gear 50 on the driving shaft 11 meshes with a spiral gear 51 on a spindle 52. The latter carries a gear 53 operating an intermediate gear 54, that drives a gear 55 on an extension 91 of the lower screw 33, by which the screw is rotated. The spindle 52 also carries a sprocket 56 engaged by a chain 57 passing to the top of the casing and around a sprocket 58 on a spindle 59, rotatably mounted in the casing. A gear 60 on the spindle 59, through intermediate gear 61 and 92 drives a gear 62 on the extension 63 of the upper screw member 32; by which the upper screw member is rotated from the driving shaft 11, and this gear is so arranged that the screw members 32 and 33 will rotate in unison. At the other end of the shaft 11, an identical arrangement is employed for driving the two screw members 47 and 48, which is not shown except as partially indicated in Fig. 3, but being identical with that described, will be readily understood.

The shutter arrangement for cutting off the light rays during the movement of the turret to bring the next plate into position for exposure is shown as comprising a pair of cylindrical shells 93 and 94 that rotate about a stationary plug member 95 that is shown separately in Fig. 9, and in relation to the shells in Fig. 8. The plug is carried on a stem 96 supported adjustably at 64. The plug also has a stem 65 adjustably mounted at 66 in the frame. This plug has a horizontal bore 67 alining with the path of rays between the light and the lenses. The plug is also shown in these views as provided with a series of slots 68 extending transversely across the bore 67; which are for the purpose of receiving suitable color plates or screens, any one of different colors as may be desired, or a series of them, such as the primary colors to produce the results well known in this art, of colored pictures on the screen.

A sleeve 69 carrying at its lower end a gear 70 rotates on the stem 96 and is shown as provided with a step bearing 71 of the ball type to reduce friction. This sleeve 69 carries a head 72 on which is secured the inner sleeve 93, and which sleeve is provided with opposite openings 73 and 74 that register with the ends of the bore 67, as the shell 94 is rotated by the sleeve, and gear 70. The gear 70 meshes with a gear 75 (see Fig. 3) carried by a shaft 76 suitably supported in bearings, and which carries a spiral gear 77 meshing with a gear 78 on the driving shaft 11; by which means the shell 94 is rotated. This means is timed to effect one rotation of the shell 94 for each advance of the turret, and the openings are brought to register with the opening 67 in the plug.

The outer shell 93 that surrounds the shell 94 is provided with two openings 79 and 80 arranged opposite to register with the bore 67 in the plug on rotation of the shell. This shell is carried by a disk 81 supported on top of the plug 95 by a ball-bearing device 82, and guided by the upper stem 65 of the plug. To rotate this outer shell it is provided with a toothed ring 83 at its lower portion that engages a series of bevel gears 84 carried by a stationary ring 85, that connects with the side plate by a pin 86 to prevent its rotation. These gears 84 also mesh with the toothed periphery of the head 72.

It will be seen that as the head 72 is rotated from the driving shaft by the means just described, these bevel gears 84 will rotate and cause the swinging of the toothed ring 83, and consequently the shell 93 in the opposite direction to the rotation of the shell 94, and at the same speed. These shells are so arranged that their openings will register with each other at the same time that they register with the bore of the plug to expose the image on the plate; and since they move from the two opposite sides to the center to close the path of light, and conversely will open the path of light from the center toward the outside.

From the above described arrangement it will be seen that a turret is provided having intermittent movement to bring image plates or sensitive plates alternately into the path of light and advance them beyond said path, and that a set of separate plates are engaged by a feed member and advanced from a contiguous position to be separated and presented intermittently to the turret to be engaged by the faces as successively brought to the feeding position; and that after exposure or exhibition the plates are engaged by a retracting member and withdrawn from the turret and placed in a contiguous series in a suitable receptacle in proper order for future use. It will be further understood that while the turret or holder for the plates has imparted to it the usual intermittent advance movement, the feeding means for supplying the plates, and also the means for withdrawing the plates after exposure, operate by a continuous movement, and wear and tear and breakage or scratching is thereby obviated.

As shown, the extremity of each of the screw members, 32 and 33 (that are duplicate but reversed), as shown in Figs. 13, 14 and 21, has the helical slot continued, as at 331 in Fig. 21, in a circular direction, with an abrupt incline 98 leading to the flat end of the screw 333. This is for the purpose of causing the plates 26, that will be slightly inclined by reason of the lead of the helical grooves, to be brought perpendicular to the axis of the screw and hence parallel with the adjacent face of the turret. The incline 98 will advance the slide still farther and it will engage the end of the screw that extends in a plane perpendicular to the axis surrounding the stem of the screw. But at this time the extensions 28 and 29 of the slides will be advanced between the lugs 25 of the turret and engaged thereby to prevent lateral displacement; and upon movement of the turret will be swung along with it beyond the screw member.

In regard to the other screw members 47 and 48, that are also duplicates but reversed, as shown in Figs. 13, 14, 22 and 23, the helical groove is expanded and terminates at a portion 100, and the screw has a cut-away portion 101. This is for the purpose of permitting the turret to advance the slide to bring the groove portions of the extensions of the slide to register concentric with these screw members, and permit them to be engaged by the wedge shaped portion 100 as the screw rotates, by which means the slides will be engaged and drawn away from the turret face and advanced by these screws.

I claim—

1. The combination of a rotatable turret, rotatable feeding and withdrawing devices, means for operating the said two devices continuously, means connected with the said latter means and adapted to advance the turret intermittently and including a series of radially extending pins, and a continuously moving cam operatively connected with the said feed and withdrawing devices and formed with a circumferential positioning rib merging into helical driving rib-extensions, said circumferential rib adapted to engage said pins and hold the turret stationary, and said helical extensions adapted to advance the turret.

2. The combination with the rotatable turret, feeding and withdrawing devices, means for operating the said two devices continuously, of means connected with the said latter means for advancing the turret intermittently and including a shaft connected with the turret and provided with a series of radially extending pins thereon, and a continuously moving cam operatively connected with the said feeding and withdrawing devices, the cam member having a rib that is partly circular and engaging the said pins to hold the turret stationary, the circular rib having a broken portion with the ends extending spirally whereby to swing the pins and shaft a unit distance and advance the turret, the circular rib extending about two-thirds of the circumference with the other one-third of the cam being occupied by the spiral portions.

3. The combination with the rotatable turret, feeding and withdrawing devices, and means for operating the said two devices continuously, of means connected with the said latter means for advancing the turret intermittently and including a shaft connected with the turret and provided with a series of radially extending pins thereon, and a continuously moving cam connected with the said feeding and withdrawing devices, the cam member having a rib that is partly circular and engaging the said pins to hold the turret stationary, the circular rib having a broken portion with the ends extending spirally whereby to swing the pins and shaft a unit distance and advance the turret, said shaft having six pins extending radially and provided with cylindrical rollers thereon, a circular rib having its sides extending at an angle of sixty degrees and engaging two adjacent pin rollers.

4. In a device of the class described, the combination of a set of slides having projections on each of two opposite edges of less width than the edges to form shoulders, the ends of said projections being inwardly curved, a pair of parallel screw members offset a sufficient distance to receive the slides between them with the curved portions carried between the threads, whereby the turning of the screws will advance the slides.

5. In a device of the class described, the combination of a set of slides having projections on each of two opposite edges of less width than the edges to form shoulders, the ends of said projections being inwardly curved.

6. In a device of the class described, the combination of a set of slides having projections on each of two opposite edges of less width than the edges to form shoulders, means arranged to advance the slides, and a rotatably mounted turret having a series of flat faces containing openings therein and arranged to be successively brought adjacent the ends of the advancing means to receive the slides as advanced, the turret having at such faces lugs arranged to engage the ends of the said projections, and guiding means arranged to retain the slides as the turret is advanced.

7. The combination of a turret, a pair of screw members arranged with their axes parallel and the ends lying adjacent the turret to receive the slides therefrom at the threaded portion of the screw, each of the screw members having at said end a flattened chord portion, as 101, to receive the end of the image plate, and also having the spiral groove of the screw enlarged, as at 100, and having a reduced circular portion 102.

8. In a device of the character described, the combination of a member having means for receiving an image member, and actuating means for said member organized and constructed to produce an intermittent movement of the image holding member from the continuous movement of the actuating member, and wherein the period of time that the image member is held stationary is considerably greater than the period of time in which the image holding member is advanced to bring the next successive image member into focus.

9. In a device of the character described, the combination of a member having means for receiving an image member, and actuating means for said member organized and constructed to produce an intermittent movement of the image holding member from the continuous movement of the actuating member, and wherein the period of time that the image member is held stationary is substantially double that of the period of time in which the image holding member is advanced to bring the next successive image member into focus.

10. A slide-exposure apparatus comprising a revoluble, open, prismatic exposer adapted to receive and support slides and to be positioned with them substantially perpendicular to an exposure axis; feed apparatus adapted to receive slides in close packs, and advance, separate, and feed them singly to said exposer; and operating means operably connected with and adapted to operate said exposer and feed apparatus and to position the former.

11. A slide-exposure apparatus comprising a revoluble, open, prismatic exposer adapted to receive and support slides and to be stopped and positioned with them substantially perpendicular to an exposure axis; feed apparatus adapted to receive slides in close packs of slides and advance the packs and separate the slides thereof with a graduated motion and feed them singly to said exposer; and operating means operably connected with and adapted to operate said exposer and feed apparatus and to position the former and time its movements relatively to the motion of the feed apparatus.

12. A slide-exposure apparatus comprising a revoluble, open prismatic exposer adapted to receive and support slides and to be stopped and positioned with a slide substantially perpendicular to an exposure axis; feed apparatus adapted to receive slides in close packs and advance, and separate, with a graduated motion, and to feed them singly to said exposer and to pick them singly therefrom, remove and deliver them, by a graduated motion, in close packs; and operating means, operably connected with and adapted to operate said exposer and feed apparatus and to position the former and time its movements relatively to the motion of the feed apparatus.

13. A slide-exposure apparatus comprising a revoluble, open, prismatic exposer adapted to receive and support slides and to be stopped and positioned with a slide substantially perpendicular to an axis; positive and negative feed apparatus operably connected with said exposer to opposite sides of such axis, and adapted to receive slides in close packs, and advance and separate with a graduated motion and to feed them singly to said exposer and to pick them singly therefrom, remove and deliver them, by a graduated motion, in close packs; and operating means, operably connected with and adapted to operate said exposer and feed apparatus and to position the former and time its movements relatively to the motion of said feed apparatus.

14. A slide-exposure apparatus comprising a revoluble, open, prismatic exposer adapted to receive and support slides and to be positioned with them substantially perpendicular to an exposure axis; feed apparatus adapted to receive slides in close packs, and substantially parallel with a stop-position of a face of said exposer, and, without substantially modifying such parallelism, advance, separate, and feed them singly to said exposer; and operating means, operably connected with and adapted to operate said exposer and feed apparatus and to position the former.

15. A slide-exposure apparatus comprising a revoluble, open, prismatic exposer adapted to receive and support slides and to be stopped and positioned with them substantially perpendicular to an exposure axis; feed apparatus adapted to receive slides in close packs and substantially parallel with a stop-position of a face of said exposer, and, without substantially modifying such parallelism, advance the packs and separate the slides thereof with a graduated motion and feed them singly to said exposer; and operating means, operably connected with and adapted to operate said exposer and feed apparatus and to position the former and time its movements relatively to the motion of feed apparatus.

16. A slide-exposure apparatus comprising a revoluble, open, prismatic exposer adapted to receive and support slides and to be stopped and positioned with a slide substantially perpendicular to an exposure axis; feed apparatus adapted to receive slides in close packs and substantially parallel with a stop-position of a face of said exposer, and, without substantially modifying such parallelism, advance and separate, with a graduated motion, feed them singly to said exposer, pick them singly therefrom, and remove and deliver them, by a graduated motion, in close packs; and operating means, operably connected with and adapted to operate said exposer and feed apparatus and to position the former and time its movement relatively to the motion of the feed apparatus.

17. A slide-exposure apparatus comprising a revoluble, open, prismatic exposer adapted to receive and support slides and to be stopped and positioned with a slide substantially perpendicular to an axis; positive and negative feed apparatus operably connected with said exposer to opposite sides of such axis, and adapted to receive slides in close packs, and substantially parallel with a stop-position of a face of said exposer, and, without substantially modifying such parallelism, advance and separate, with a graduated motion, and to feed them singly to said exposer and to pick them singly therefrom, remove and deliver them, by a graduated motion, in close packs; and operating means, operably connected with and adapted to operate said exposer and feed apparatus and to position the former and time its movements relatively to the motion of said feed apparatus.

18. A slide-exposure apparatus comprising a revoluble, open, prismatic exposer adapted to receive and support slides and to be stopped and positioned with them substantially perpendicular to an exposure axis; feed apparatus adapted to receive slides in close packs and substantially parallel with a stop-position of a face of said exposer, and, without substantially modifying such parallelism, advance the packs and separate the slides thereof with a continuous graduated motion and feed them singly to said exposer; and operating means, operably connected with and adapted to operate said exposer and feed apparatus and to position the former and time its movements relatively to the motion of the feed apparatus.

19. A slide-exposure apparatus comprising a revoluble, open, prismatic exposer adapted to receive and support slides and to be stopped and positioned with a slide substantially perpendicular to an exposure axis; feed apparatus adapted to receive slides in close packs and substantially parallel with a stop-position of a face of said exposer, and without substantially modifying such parallelism, advance and separate with a continuous graduated motion, feed them singly to said exposer, pick them singly therefrom, and remove and deliver them, by a graduated motion, in close packs; and operating means, operably connected with and adapted to operate said exposer and feed apparatus and to position the former and time its movement relatively to the motion of the feed apparatus.

20. A slide-exposure apparatus comprising a revoluble, open, regular prismatic exposer with an even number of like faces and a slide socket in each face and adapted to be positioned with opposite faces perpendicular to an exposure axis; feed apparatus to one side of such exposure axis, operably connected with, and having its feed-axis substantially perpendicular to a face of said exposer when it is positioned as aforesaid and comprising parallel feed screws, the shanks of said screws forming guides and a feed-way for slides, and raised threads of equal pitch on said shanks adapted to traverse slides through such feed-way; and operating means, operably connected with and adapted to operate said exposer and feed screws and to position the former and time its movements relatively to the motion of said screws.

21. A slide-exposure apparatus comprising a revoluble, open, regular prismatic exposer with an even number of like faces and a slide socket in each face and adapted to be positioned with opposite faces perpendicular to an exposure axis; feed apparatus to one side of such exposure axis, operably connected with, and having its feed-axis substantially perpendicular to a face of said exposer when it is positioned as aforesaid and comprising parallel feed screws, the shanks of said screws forming guides and a feed-way for slides, and raised threads of equal graduated pitch on said shanks adapted to traverse slides through such feedway; and operating means, operably connected with and adapted to operate said exposer and feed screws and to position the former and time its movements relatively to the motion of said screws, said feed-way adapted to receive slides in close packs, and said threads adapted to separate and traverse them and feed them singly to said exposer.

22. A slide-exposure apparatus comprising a revoluble, open, regular prismatic exposer with an even number of like faces and a slide socket in each face and adapted to be positioned with opposite faces perpendicular to an exposure axis; feed apparatus to one side of such exposure axis, operably connected with, and having its feed-axis substantially perpendicular to a face of said exposer when it is positioned as aforesaid and comprising parallel feed screws, the shanks of said screws forming guides and a feed-way for slides, raised threads of equal graduated pitch on said shanks, and a cam-like, slide-positioning face on each of said screw threads adjacent to said exposer, such feed-way adapted to receive slides in close packs, said threads adapted to traverse them through such feed-way and separate them and said positioning thread-faces adapted to position them for delivery to and feed them singly and successively to said sockets of said exposer; and operating means, operably connected with and adapted to operate said exposer and feed-screws and to position the former and time its movements relatively to the motion of said screws.

23. A slide-exposure apparatus comprising a revoluble, open, regular prismatic exposer with an even number of like faces and a slide socket in each face and adapted to be positioned with opposite faces perpendicular to an exposure axis; feed apparatus to one side of such exposure axis, operably connected with, and having its feed-axis substantially perpendicular to a face of said exposer when it is positioned as aforesaid and comprising parallel feed screws, the shanks of said screws forming guides and a feed-way for slides, raised threads of equal graduated pitch on said shanks, and, adjacent to said exposer, cams terminating the positive and negative helical sides of said threads, such feed-way adapted to feed and deliver slides in close packs, said threads adapted to traverse slides through such channel, gradually separate them when feeding positively and close up and repack them when feeding negatively, said cam on the thread-side facing the ejector adapted to position for delivery and deliver slides to said exposer and said oppositely facing cam adapted to pick slides therefrom; and operating means, operably connected with and adapted to operate said exposer and feed screws and to position the former and time its movements relatively to the motion of said screws.

24. A slide-exposure apparatus comprising a revoluble, open, regular prismatic exposer with an even number of like faces and a slide socket in each face and adapted to be positioned with opposite faces perpendicular to an exposure axis; feed apparatuses located on opposite sides of such exposure axis each operably connected with and having their respective feed-axes substantially perpendicular to a face of said exposer when it is positioned as aforesaid and each comprising parallel feed screws, the shanks of said screws forming guides and a feed-way for slides, and raised threads of equal pitch on said shanks adapted to traverse slides through such feed-way; and operating means operably connected with and adapted to operate said exposer and feed-screws and to position the former and time its movements relatively to the motion of said screws.

25. A slide-exposure apparatus comprising a revoluble, open, prismatic exposer adapted to be positioned with faces thereof perpendicular to and with its axis of revolution intersecting an exposure axis, positive and negative feed apparatuses located with their respective feed axes in one plane with and intersecting such exposure axis, and operating means operably connected with and adapted to operate said exposer and feed apparatuses and to position the former and time its movements relatively to the motion of said feed apparatuses.

26. A slide-exposure apparatus comprising a revoluble, open, prismatic exposer adapted to be positioned with faces thereof perpendicular to and with its axis of revolution interesting an exposure axis, feed apparatus located with its feed axis in one plane with and intersecting such exposure axis, and operating means operably connected with and adapted to operate said exposer and feed apparatus and to position the former and time its movements relatively to the motion of said feed apparatus.

27. A slide-exposure apparatus comprising a revoluble, open, prismatic exposer adapted to be stopped and positioned with faces thereof successively substantially perpendicular to an exposure axis; a feed apparatus located with its feed axis substantially perpendicular to a face of said exposer when it is positioned as aforesaid and comprising parallel feed screws, the shanks of said screws forming guides and a feed-way for slides and raised threads of equal graduated pitch on said shanks; and a transmission apparatus operably connected with a source of power and with said exposer and feed screws and comprising a driving shaft; a driving and positioning gearing operably connecting said shaft and exposer and adapted to turn successive exposer faces across and stop and position them substantially perpendicular to said exposure axis; and a gearing operably connecting said shaft with said feed screws and adapted to uniformly drive and cause them to revolve once every time said exposer is moved and positioned as aforesaid.

28. A slide-exposure apparatus comprising a revoluble, open, prismatic exposer adapted to be stopped and positioned with faces thereof successively substantially perpendicular to an exposure axis; a feed apparatus located with its feed axis substantially perpendicular to a face of said exposer when it is positioned as aforesaid and comprising parallel feed screws, the shanks of said screws forming guides and a feed-way for slides and raised threads of equal graduated pitch on said shanks; and a transmission apparatus operably connected with a source of power and with said exposer and feed-screws and comprising a driving shaft; a driving and positioning gearing operably connecting said shaft and exposer and comprising a worm on said shaft and meshed therewith a worm wheel connected with said exposer, said worm having a thread whose medial portion has no pitch and merges into helical similarly-pitched extensions, and spur gearing operably connecting said shaft and feed screws and adapted to uniformly drive and cause them to revolve once every time said exposer is moved and positioned by said worm gearing.

29. A slide-exposure apparatus comprising a revoluble, open, prismatic exposer adapted to be stopped and positioned with faces thereof successively substantially perpendicular to an exposure axis; a feed apparatus located with its feed axis substantially perpendicular to a face of said exposer when it is positioned as aforesaid and comprising parallel feed screws, the shanks of said screws forming guides and a feed-way for slides and raised threads of equal graduated pitch on said shanks; and a transmission apparatus operably connected with a source of power and with said exposer and feed-screws and comprising a driving shaft; a driving and positioning gearing operably connecting said shaft and exposer, and comprising a worm on said shaft and meshed therewith a worm wheel connected with said exposer, said worm having a thread whose medial portion has no pitch, extends substantially two-thirds around said worm and merges into helical similarly-pitched extensions, each of which extends substantially one-third around said worm, and spur gearing operably connecting said shaft and feed screws and adapted to uniformly drive and cause them to revolve once every time the said exposer is moved and positioned by said worm gearing.

30. A slide-exposure apparatus comprising a revoluble, open, prismatic exposer adapted to be stopped and positioned with faces thereof successively substantially perpendicular to an exposure axis; a feed apparatus located with its feed axis substantially perpendicular to a face of said exposer when it is positioned as aforesaid and comprising parallel feed screws, the shanks of said screws forming guides and a feed-way for slides and raised threads of equal graduated pitch on said shanks; and a transmission apparatus operably connected with a source of power and with said exposer and feed-screws and comprising a driving shaft; a driving and positioning gearing operably connecting said shaft and exposer, and comprising a worm on said shaft and meshed therewith a worm wheel connected with said exposer, said worm having a thread whose medial portion has no pitch, extends substantially two-thirds around said worm and merges into helical similarly-pitched extensions, each of which extends substantially one-third around said worm and is graduated in pitch from no-pitch at its extremity and where it merges with said medial portion to maximum pitch intermediate therebetween, and spur gearing operably connecting said shaft and feed screws and adapted to uniformly drive and cause them to revolve once every time said exposer is moved and positioned by said worm gearing.

31. A slide-exposure apparatus comprising a revoluble, open, prismatic exposer adapted to be stopped and positioned with faces thereof substantially perpendicular to an exposure axis; feed apparatus located with its feed axis substantially perpendicular to a face of said exposer when it is positioned as aforesaid and comprising a pair of parallel feed screws, the shanks of said screws forming guides and a feed-way for slides and raised threads of equal pitch on said shanks; a slide comprising a frame adapted to hold a photographic plate and engaging conformations on opposite sides of said slide adapted to engage said screw shanks and thread and thereby to be positioned in such feed-way and traversed therein by the revolution of said screws; and operating means, operably connected with and adapted to operate said exposer and screws and stop and position the former.

32. A slide for photographic plates adapted to engage and be positioned and traversed by a pair of parallel feed screws and comprising a plate holder and engaging conformations on opposite sides of said slide adapted to engage opposite chordal faces of a pair of parallel screw shanks and to be thereby positioned and also to engage threads of the parallel screws and to be traversed by their revolutions.

33. A slide-exposure apparatus, a revoluble prismatic exposer adapted to be stopped and positioned with successive faces substantially perpendicular to an exposure axis and to be fed slides and have them removed by positive and negative feed apparatus located on opposite sides of such exposure axis and adapted to feed and remove slides substantially perpendicular to faces of said exposer when positioned as aforesaid, said exposer comprising a mounting spindle, a lantern-like body axial thereon and interrupted-disk formations on said body, the interruptions of said disk-formations constituting slide-sockets; and a fixed posterior cylindrical-sector envelop extending concentric with said disk-formations between such positive and negative feed apparatus and having an axial exposure opening and adapted to retain slides in such sockets of said exposer during its movements.

34. In a slide-exposure apparatus, a revoluble, open, regular prismatic exposer adapted to be stopped and positioned with successive faces substantially perpendicular to an exposure axis and comprising a mounting spindle and a lantern-like body, adjustable bearings for said spindle, and means to adjust said bearings and thereby the location of said exposer relatively to said axis.

35. A slide-exposure apparatus comprising a revoluble, open, prismatic exposer adapted to be stopped and positioned with successive faces substantially perpendicular to an exposure axis; a feed apparatus located with its feed axis substantially perpendicular to a face of said exposer when positioned as aforesaid and comprising a pair of parallel feed screws with uniform shanks and raised threads of equal pitch, said screw-shanks forming guides and a feed-way for slides and said thread adapted to traverse them therein, and a gear wheel of less diameter than said shanks fast on the outer end of each of them, and a fixed tubular slotted housing enveloping each of said gears and extending said screw shank to which it is attached; and operating means operably connected with said gears and exposer and adapted to operate said feed screws and exposer and position the latter.

36. A slide-exposure apparatus comprising a revoluble, open, prismatic exposer adapted to be stopped and positioned with successive faces substantially perpendicular to an exposure axis; a feed apparatus located with its feed axis substantially perpendicular to a face of said exposer when positioned as aforesaid and comprising a pair of parallel feed screws with uniform shanks and raised threads of equal pitch, said screw-shanks forming guides and a feed-way for slides and said thread adapted to traverse them therein, a gear wheel of less diameter than said shanks fast on the outer end of each of them, a fixed tubular slotted housing enveloping each of said gears and extending said screw shank to which it is attached; and cylindrical extensions of said screw shanks and housings, extending the feed-way formed thereby; and operating means, operably connected with said gears and exposer and adapted to operate said feed screws and exposer and position the latter.

37. A slide-exposure apparatus comprising a revoluble, open, prismatic exposer adapted to be stopped and positioned with successive faces substantially perpendicular to an exposure axis; a feed apparatus located with its feed axis substantially perpendicular to a face of said exposer when positioned as aforesaid and comprising a pair of parallel feed screws with uniform shanks and raised threads of equal pitch, said screw-shanks forming guides and a feed-way for slides and said thread adapted to traverse them therein, a pair of fixed cylindrical rods extending said screw shanks and the feed-way formed thereby; and operating means operably connected with and adapted to operate said feed screws and exposer and to position the latter.

ALEXANDER G. DONNELLY.

Witnesses:
FRED. J. DOLE,
HENRY E. GREENWOOD.

---

Copies of this patent may be obtained for five cents each, by addressing the "Commissioner of Patents, Washington, D. C."